G. B. & W. W. FOLLETT.
STEAM COOKER.

No. 183,915.                                   Patented Oct. 31, 1876.

Witnesses:
P. C. Dieterich
F. H. Duffy

Inventors:
Geo. B. Follett
Wm. W. Follett
Per: C. H. Watson & Co. Attorneys

UNITED STATES PATENT OFFICE.

GEORGE B. FOLLETT AND WILLIAM W. FOLLETT, OF GREEN BAY, WIS., ASSIGNORS OF ONE-THIRD THEIR RIGHT TO WALTER CARSWELL, OF SAME PLACE.

IMPROVEMENT IN STEAM-COOKERS.

Specification forming part of Letters Patent No. 183,915, dated October 31, 1876; application filed April 25, 1876.

*To all whom it may concern:*

Be it known that we, GEORGE B. FOLLETT and WILLIAM W. FOLLETT, of Green Bay, in the county of Brown and State of Wisconsin, have invented certain new and useful Improvements in Steam-Cookers; and we do hereby declare that the following is a full, clear, and exact description thereof, which will enable others skilled in the art to which it appertains to make and use the same, reference being had to the accompanying drawings, and to the letters of reference marked thereon, which form a part of this specification.

The nature of our invention consists in the construction and arrangement of a sectional steam-cooker, as will be hereinafter more fully set forth.

Figure 1:
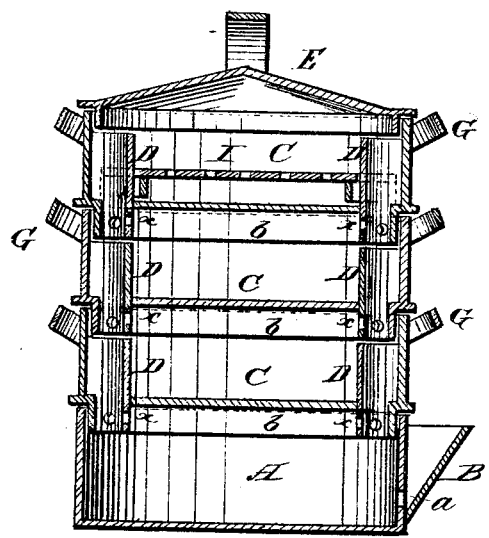
Figure 2:
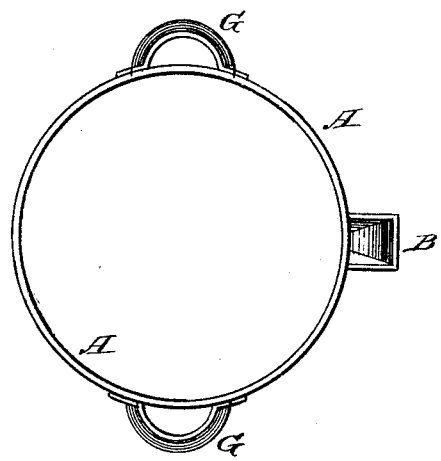
Figure 3:
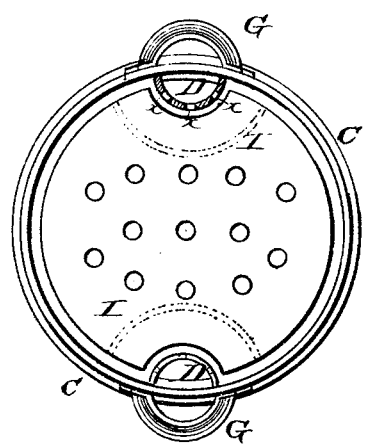

In the annexed drawing, Figure 1 is a central vertical section. Fig. 2 is a plan view of the kettle or reservoir, and Fig. 3 represents a plan view of one of the vessels or steamers.

A represents the kettle or reservoir for generating steam, made of any suitable dimensions, and provided with a spout, B, which is made large at the top, so as to make it easy to add water when required. The hole $a$, forming the communication between the spout B and interior of the reservoir A, is at the bottom of the reservoir, thus preventing the steam from escaping. C C represent a series of vessels or steamers, all constructed precisely alike, so that it makes no difference in what order they are placed on the reservoir. Each vessel C is formed under its bottom with a flange, $b$, to fit within the top of the vessel on which it is placed, or on the reservoir A. On opposite sides of each vessel C are two tubes, D D, the lower ends of which are level with the bottom edge of the flange $b$, and their upper ends as far below the top edge of the vessel as the depth of the flange on the vessel above, so that when the vessels are placed on top of each other the tubes D D will join together and form two continuous tubes, extending from the reservoir at the bottom to the top vessel. As many vessels as desired may be used at one time. In the lower end of each tube D, immediately below the bottom of the vessel, are holes $x\ x$, for the escape of steam into the vessel below, or in the top end of tube, if desired. On the sides of each vessel C are handles G G, which are located directly opposite the tubes, so that in placing the vessels on top of each other it is only necessary to see that the handles are on a line, when the tubes will fit over each other. The top vessel is provided with a cover, E. I represents a perforated false bottom or grating, to be used in either of the steamers or vessels C, as required.

This steamer is very simple, cheap, and durable, and anybody can put the parts together by simply keeping the handles in line; and there is no short corner or raw edge on tube, inside or out, to hinder washing after using.

Having thus fully described our invention, what we claim as new, and desire to secure by Letters Patent, is—

The reservoir A, having enlarged spout B, opening $a$ at the bottom of the reservoir, in combination with the steamers C, each having flange $b$, perforated side tubes D D, handles G, holes $x$, and perforated false bottom I, all substantially as and for the purpose set forth.

In testimony that we claim the foregoing as our own we affix our signatures in presence of two witnesses.

GEORGE B. FOLLETT.
WILLIAM W. FOLLETT.

Witnesses:
M. L. MAILEE,
OTTO OLDENBURG.